Jan. 3, 1933.  M. J-B. BARBAROU  1,893,192

PACKING JOINT FOR WATER COOLED INTERNAL COMBUSTION ENGINES

Filed April 6, 1931

Marius Jean-Baptiste Barbarou
INVENTOR.
By
his Attorney.

Patented Jan. 3, 1933

1,893,192

UNITED STATES PATENT OFFICE

MARIUS JEAN-BAPTISTE BARBAROU, OF NEUILLY-SUR-SEINE, FRANCE

PACKING JOINT FOR WATER COOLED INTERNAL COMBUSTION ENGINES

Application filed April 6, 1931, Serial No. 527,942, and in France May 3, 1930.

The present invention relates to water cooled internal combustion engines, and more particularly to those which comprise cylinders made of two parts, consisting respectively of a steel barrel and of an outer body, made of some light alloy.

According to my invention, the gasket which ensures water tightness between the steel barrel and the outer body at the lower end of the cylinder water jacket is so disposed as to be cooled by the presence of a sheet of circulating water interposed between the barrel and the gasket housing.

This arrangement makes it possible to prevent the two pieces which are in contact from expanding unequally which might cause a certain play between said pieces and consequently a leak of water. In the case of a rubber gasket, particularly sensitive to heat, the cooling of the bottom of the outer body, where the gasket is located, prevents said gasket from drying up and enables it to keep for a longer time its elastic qualities.

Preferred embodiments of my invention will be hereinafter described with reference to the appended drawing, given merely by way of example and in which.

Figure 1:
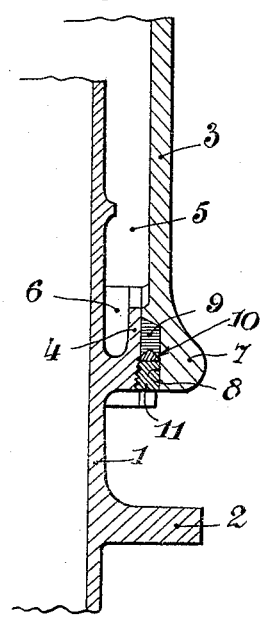
Fig. 1 is a vertical section of a part of the steel barrel of the cylinder and of the outer body, showing a gasket arrangement according to my invention.

According to the example shown in Fig. 1, barrel 1 of the cylinder, which is made of steel for example, rests on the crank-casing of the engine by a shoulder 2. The jacket or outer body 3, made of some light alloy (aluminium, for example) is coaxially disposed on a circular shoulder 4 of barrel 1 and limits, together with said barrel, water chamber 5. Shoulder 4 is hollowed out in 6, so that a sheet of circulating water may be interposed at the height of the gasket between said gasket and the steel barrel. The outer body 3 is provided at its lower end with a projecting annular part 7, in which is located a conical groove 8. At the bottom of said groove is mounted a gasket 9, made of rubber, or any similar material. An intermediate piece 10 is interposed between gasket 9 and a nut 11, screwed onto shoulder 4 of steel barrel 1, so as to prevent screw 11 from bearing directly on gasket 9.

The water contained in recess 6, cools shoulder 4 and the bottom of the outer body 3 and prevents expanding of the pieces.

However, considering the nature of the metals which are in contact, if the cooling is not sufficient, there may result therefrom, according to the direction of the expansion, either an increase of the tightening or a decrease of the tightening action of the gasket.

Figure 2:
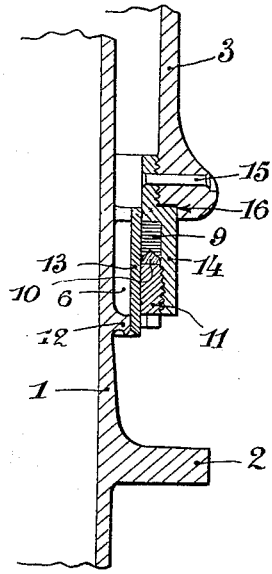
Figure 3:
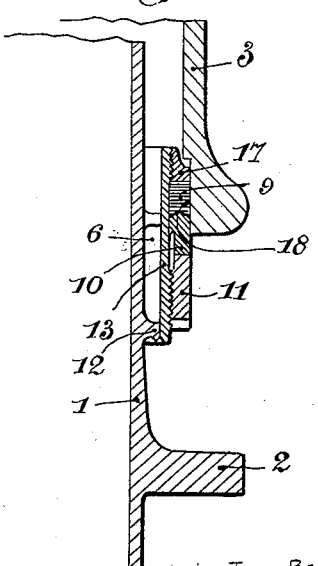

The embodiments of Figs. 2 and 3 make it possible to avoid this disadvantage, by producing a relative sliding between pieces 1 and 3.

In the example of Fig. 2, barrel 1 is provided with a projecting annular part 12, on which is welded a sleeve 13, whose outer surface is cylindrical. The outer body 3, made of a light alloy, is threaded at its base and receives a ring 4, which serves as a housing for rubber gasket 9. Said ring, screwed onto body 3 is locked by a pin 15, for example. A small supplementary gasket 16 prevents leakage of water between the screw threads. A nut 11 compresses gasket 9 in its housing through the intermediary of a ring 10, and applies it onto the shoulder of sleeve 14. The water contained in chamber 6 cools all the lower part up to the level of the gasket, and, if barrel 1 expands, sleeve 13 slides over gasket 9 without any variation in the tightness. Water tightness is ensured by the radial tension of joint 9.

In the example of Fig. 3, the arrangement is reversed, the whole of barrel 1, sleeve 13, gasket 9 and nut 11 being able to slide along outer body 3, parallelly to the axis of the cylinder. For this purpose, sleeve 13 is threaded at both ends. The upper threads serve to fix a ring 17 to retain rubber gasket 9. The tightening nut 11 is screwed onto the lower threads of sleeve 13 and compresses said gasket 9 by means of a circular piece 10. Outer body 3 is provided with a circular groove 18, in which the gasket slides, if there is any expansion of the metal.

Figure 4:
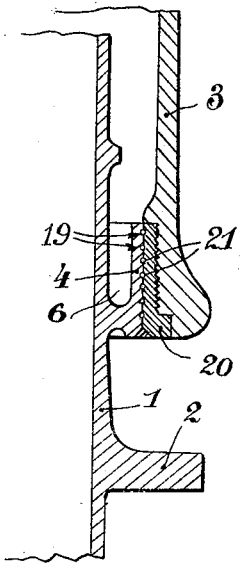
Figs. 2 to 4 show different embodiments of my device.

Fig. 4 shows another embodiment, which may be applied when the assembling is made once for all. According to this example, the outer cylindrical surface of shoulder 4 of element 1 is provided with a few grooves 21 and its surface is tinned. The outer body 3 is threaded at its base, and receives nut 20 which is also provided with grooves 21, and whose surface is tinned. Nut 20 is screwed in body 3 before the mounting of steel barrel 1. After the two pieces have been put together, all the part adjoining the gasket is heated, so that the tin 19 may melt and fill up grooves 21 and all the free spaces, and ensure, after cooling, perfect water tightness.

While I have disclosed what I deem to be the preferred form of my device I do not wish to be limited thereto as there might be changes made in the construction, disposition and form of the parts without departing from the spirit of my invention as comprehended within the scope of the appended claims.

What I claim is:

1. An internal combustion engine cylinder comprising a steel barrel, an annular gutter shaped part projecting from said barrel, an outer body made of a light alloy, and in coaxial relation with said barrel so as to form the outer wall of a water jacket, and connecting means between the outer surface of said gutter shaped annular part and the lower end of said outer body embodying a packing member, whereby the water located in the annular gutter shaped part protects the packing member and prevents unequal expansion of the pieces in contact.

2. An internal combustion engine cylinder comprising in combination a steel barrel, an annular gutter shaped part projecting from said barrel, an outer body made of a light alloy disposed in coaxial relation to said barrel so as to form the outer wall of a water jacket surrounding the barrel, and a ring shaped gasket disposed between the outer surface of said gutter shaped annular part and the lower end of said outer body, whereby the water located in the annular gutter shaped part protects the gasket and prevents unequal expansion of the pieces in contact.

3. An internal combustion engine cylinder comprising in combination a steel barrel, an annular gutter shaped projection integral with said barrel, an outer body made of a light alloy fixed in coaxial relation to said barrel and engaging the outer wall of said gutter shaped projection so as to form a water jacket around said barrel, said outer body being provided with an annular groove in its inner lower part adjoining the gutter shaped projection, a ring shaped gasket in said groove, and means for fixing said gasket in said groove.

4. An internal combustion engine cylinder according to claim 3 in which the means for fixing the gasket in the groove comprise an annular nut adapted to screw on the lower part of the gutter shaped projection for tightly holding said gasket in position, and an annular ring interposed between said gasket and said nut.

5. An internal combustion engine cylinder comprising in combination a steel barrel, an annular projection on said barrel, a sleeve welded to said projections so as to form a gutter shaped member coaxial with said barrel, an outer body made of a light alloy fixed in coaxial relation to said barrel so as to form the outer wall of a water jacket surrounding said barrel, a ring screwed onto the lower end of said outer body and adapted to engage the outer surface of said sleeve, said ring being provided with a groove in its inner lower part adjoining the sleeve, a ring shaped gasket in said groove, and means for fixing said gasket in said groove.

6. An internal combustion engine cylinder according to claim 5 in which the means for fixing the gasket in the groove comprise an annular nut adapted to screw in the lower inner part of said ring for tightly holding said gasket in position, and an annular element interposed between said gasket and said nut.

7. An internal combustion engine cylinder comprising in combination a steel barrel, an annular projection on said barrel, a sleeve welded to said projection so as to form a gutter shaped member coaxial with said barrel, an outer body made of a light alloy fixed in coaxial relation to said barrel so as to form the outer wall of a water jacket surrounding said barrel, said outer body being provided with a cylindrical groove in its inner lower end, a ring screwed to the upper outer portion of said sleeve and adapted to engage said groove, a gasket mounted under said ring between said sleeve and the inner grooved part of the outer body, an annular nut screwed onto the lower part of said sleeve for tightly holding said gasket in position.

8. An internal combustion engine cylinder comprising a steel barrel, an annular part projecting from the external surface of said barrel for limiting with the latter, an annular space, an outer body, the lower end of which is disposed adjacent said annular part and limiting, with said barrel and said annular part, a water jacket in communication with said annular space, connecting means engaging both said annular part and said body, and packing means engaging said annular part and connecting means for insuring water tightness of said water jacket.

9. An internal combustion engine as claimed in claim 8, wherein said connecting means comprise a ring screwed at the lower end of said body and adapted to engage said annular part, said packing means being interposed between said annular part and said ring.

In testimony whereof I have signed my name to this specification.

MARIUS JEAN-BAPTISTE BARBAROU.